United States Patent
Ragavendran

(10) Patent No.: US 11,964,816 B2
(45) Date of Patent: Apr. 23, 2024

(54) SULFUR STORAGE TANK CLEANOUT

(71) Applicant: Saudi Arabian Oil Company, Dhahran (SA)

(72) Inventor: Guru Raja Ragavendran, Ras Tanura (SA)

(73) Assignee: Saudi Arabian Oil Company, Dhahran (SA)

(*) Notice: Subject to any disclaimer, the term of this patent is extended or adjusted under 35 U.S.C. 154(b) by 443 days.

(21) Appl. No.: 17/231,582

(22) Filed: Apr. 15, 2021

(65) Prior Publication Data
US 2022/0332495 A1 Oct. 20, 2022

(51) Int. Cl.
*B65D 88/54* (2006.01)
*B65D 88/08* (2006.01)
*B65D 88/34* (2006.01)
*B65D 88/74* (2006.01)
*B65D 90/00* (2006.01)

(52) U.S. Cl.
CPC .......... *B65D 88/54* (2013.01); *B65D 88/08* (2013.01); *B65D 88/34* (2013.01); *B65D 88/748* (2013.01); *B65D 90/008* (2013.01); *B65D 2588/54* (2013.01); *B65D 2588/74* (2013.01)

(58) Field of Classification Search
CPC ........ B65D 88/54; B65D 88/08; B65D 88/34; B65D 88/748; B65D 90/008; B65D 2588/54; B65D 2588/74; G01M 3/32
See application file for complete search history.

(56) References Cited

U.S. PATENT DOCUMENTS

| 1,650,340 | A | * | 11/1927 | Glass | B65D 88/34 |
| | | | | | 169/DIG. 1 |
| 3,587,637 | A | * | 6/1971 | Coleman | B65D 88/54 |
| | | | | | 137/577.5 |
| 4,515,189 | A | | 5/1985 | Mowatt-Larssen | |
| 9,796,588 | B2 | | 10/2017 | Smith | |
| 2005/0224500 | A1 | * | 10/2005 | Hebblethwaite | B67D 7/3209 |
| | | | | | 222/146.2 |
| 2009/0134171 | A1 | * | 5/2009 | deBerardinis | B65D 90/24 |
| | | | | | 220/23.91 |

(Continued)

FOREIGN PATENT DOCUMENTS

| CN | 101139029 | | 3/2008 | | |
| CN | 212048878 | | 12/2020 | | |
| GB | 391920 | A * | 5/1933 | | C10C 3/12 |

OTHER PUBLICATIONS

Johnson et al., "Hazards of Molten Sulfur Storage & Handling" Fundamentals of Sulfur Recovery, Presented at the 53rd Annual Laurance Reid Gas Conditioning Conference, Feb. 23-26, 2003, 22 pages.

(Continued)

*Primary Examiner* — Donnell A Long
(74) *Attorney, Agent, or Firm* — Fish & Richardson P.C.

(57) ABSTRACT

A sulfur storage tank includes a bottom plate, an outer wall, and a cleanout door. The outer wall surrounds and is coupled to the bottom plate. The cleanout door is installed on the outer wall. The cleanout door includes an edge and a drain nozzle. The edge abuts the bottom plate. The drain nozzle is installed on the cleanout door. The drain nozzle defines a centerline offset from the edge. The drain nozzle is configured to gravity drain fluid from the sulfur storage tank.

11 Claims, 5 Drawing Sheets

(56) References Cited

U.S. PATENT DOCUMENTS

| | | | | |
|---|---|---|---|---|
| 2014/0245972 A1* | 9/2014 | Thiessen | ............... | F24H 9/1836 |
| | | | | 392/456 |
| 2015/0291350 A1* | 10/2015 | Sewell | ................. | B65D 90/008 |
| | | | | 49/324 |
| 2017/0225884 A1* | 8/2017 | McCoy | .................. | B65D 88/54 |
| 2020/0284073 A1* | 9/2020 | Thomas, II | ............. | E05C 1/002 |

OTHER PUBLICATIONS

"Sulfur Recovery Unit (SRU) Storage Tank Replacement" Job Industrial Services, Inc., 2021, 25 pages.

SAIP Examination Report in SAIP Appln. No. 122430929, dated Jun. 22, 2023, 13 pages, with English Translation.

\* cited by examiner

SULFUR STORAGE TANK CLEANOUT

TECHNICAL FIELD

This disclosure relates to maintenance of sulfur storage tanks.

BACKGROUND

Hydrocarbons extracted from a reservoir can contain various impurities. Hydrocarbons that are contaminated with significant amounts of sulfur compounds, such as hydrogen sulfide, is considered sour, while hydrocarbons that are contaminated with little or negligible amounts of sulfur compounds is considered sweet. Hydrogen sulfide, in particular, is highly poisonous, corrosive, and flammable. Therefore, the presence and handling of hydrogen sulfide is not only an operational concern (with respect to equipment and piping corrosion) but also a safety concern. The hydrocarbon refining processes can include processes that remove such impurities from the raw hydrocarbons, for example, before the hydrocarbons are transformed into the various products mentioned previously. Many refineries also include sulfur recovery processes that convert hydrogen sulfide (removed from the hydrocarbons) into elemental sulfur, which can be stored and subsequently sold on the market.

SUMMARY

This disclosure describes technologies relating to maintenance of sulfur storage tanks. Certain aspects of the subject matter described can be implemented as a method. A hydrostatic test is performed on a sulfur storage tank. The sulfur storage tank includes a bottom plate, an outer wall, and a cleanout door. The outer wall surrounds and is coupled to the bottom plate. The cleanout door is installed on the outer wall. The cleanout door includes an edge and a drain nozzle. The edge abuts the bottom plate. The drain nozzle is installed on the cleanout door. The drain nozzle defines a centerline offset from the edge. The drain nozzle is configured to gravity drain fluid from the sulfur storage tank. After performing the hydrostatic test, fluid is drained from the sulfur storage tank using a pump until a liquid level within the sulfur storage tank reaches a first liquid level. After draining fluid from the sulfur storage tank using the pump, fluid is gravity drained from the sulfur storage tank through the drain nozzle.

This, and other aspects, can include one or more of the following features.

In some implementations, the sulfur storage tank includes a pump feed nozzle installed on the outer wall. In some implementations, draining fluid from the sulfur storage tank using the pump includes draining fluid from the sulfur storage tank through the pump feed nozzle.

In some implementations, the sulfur storage tank includes heat tracing surrounding at least a portion of the drain nozzle. In some implementations, the heat tracing is activated while fluid is gravity drained from the sulfur storage tank through the drain nozzle.

In some implementations, after fluid is gravity drained from the sulfur storage tank through the drain nozzle of the cleanout door, the heat tracing is deactivated, and the drain nozzle is blinded.

In some implementations, a perpendicular distance from the edge of the cleanout door to the centerline of the drain nozzle is less than 4 inches and non-zero.

Certain aspects of the subject matter described can be implemented as a method. A drain nozzle is installed on a cleanout door, such that a centerline of the drain nozzle is offset from an edge of the cleanout door. After installing the drain nozzle on the cleanout door, the cleanout door is installed on an outer wall of a sulfur storage tank. The sulfur storage tank includes a bottom plate. The cleanout door is installed on the outer wall of the storage tank, such that the edge of the cleanout door abuts the bottom plate of the sulfur storage tank.

This, and other aspects, can include one or more of the following features.

In some implementations, the drain nozzle has an inner diameter in a range of from 4 inches to 6 inches and a length in a range of from 4 inches to 18 inches.

In some implementations, the drain nozzle is installed on the cleanout door, such that a perpendicular distance from the edge of the cleanout door to the centerline of the drain nozzle is less than 4 inches and non-zero.

In some implementations, the drain nozzle includes a nozzle plate, a tubular, and a flange. In some implementations, the nozzle plate and the flange are coupled to the tubular at opposite ends of the tubular. In some implementations, installing the drain nozzle on the cleanout door includes installing the nozzle plate on the cleanout door, such that the tubular protrudes from the cleanout door.

In some implementations, a ratio of a length of the tubular to the inner diameter of the drain nozzle is in a range of from 1:1 to 3:1.

In some implementations, heat tracing is installed on the drain nozzle, such that the heat tracing surrounds at least a portion of the tubular of the drain nozzle.

Certain aspects of the subject matter described can be implemented as a sulfur storage tank. The sulfur storage tank includes a bottom plate, an outer wall, and a cleanout door. The outer wall surrounds and is coupled to the bottom plate. The cleanout door is installed on the outer wall. The cleanout door includes an edge and a drain nozzle. The edge abuts the bottom plate. The drain nozzle is installed on the cleanout door. The drain nozzle defines a centerline offset from the edge. The drain nozzle is configured to gravity drain fluid from the sulfur storage tank.

This, and other aspects, can include one or more of the following features.

In some implementations, the drain nozzle has an inner diameter in a range of from 4 inches to 6 inches. In some implementations, a perpendicular distance from the edge of the cleanout door to the centerline of the drain nozzle is less than 4 inches and non-zero.

In some implementations, the drain nozzle includes a nozzle plate, a tubular, and a flange. In some implementations, the nozzle plate and the flange are coupled to the tubular at opposite ends of the tubular. In some implementations, the nozzle plate is installed on the cleanout door, such that the tubular protrudes from the cleanout door.

In some implementations, the tubular has a length in a range of from 4 inches to 18 inches. In some implementations, a ratio of a length of the tubular to the inner diameter of the drain nozzle is in a range of from 1:1 to 3:1.

In some implementations, the sulfur storage tank includes heat tracing surrounding at least a portion of the drain nozzle.

In some implementations, the sulfur storage tank includes a floating roof. In some implementations, the outer wall surrounds and is coupled to the floating roof. In some implementations, the floating roof is configured to move along a height of the outer wall based on a liquid level of fluid stored within the sulfur storage tank.

In some implementations, the sulfur storage tank includes a top plate. In some implementations, the outer wall surrounds and is coupled to the top plate. In some implementations, the floating roof is disposed between the bottom plate and the top plate.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes a sulfur storage tank. The sulfur storage tank includes a cleanout door with a drain nozzle. The subject matter described in this disclosure can be implemented in particular implementations, so as to realize one or more of the following advantages. The drain nozzle can be used to drain fluid from the sulfur storage tank that typically cannot be drained by normal pumping methods. The drain nozzle can be used to drain fluid from the sulfur storage tank that would typically need to be removed by manual handling. By reducing or eliminating the need for manual handling, the drain nozzle can be used to drain fluid from the sulfur storage tank in a safer manner, along with a reduced risk of damaging a bottom plate of the sulfur storage tank in the process. Therefore, implementing the drain nozzle on the cleanout door can reduce time and costs associated with additional bottom plate inspections and repairs. The drain nozzle can be used to drain fluid from the sulfur storage tank, such that lead time in tank maintenance is reduced.

Figure 1A:
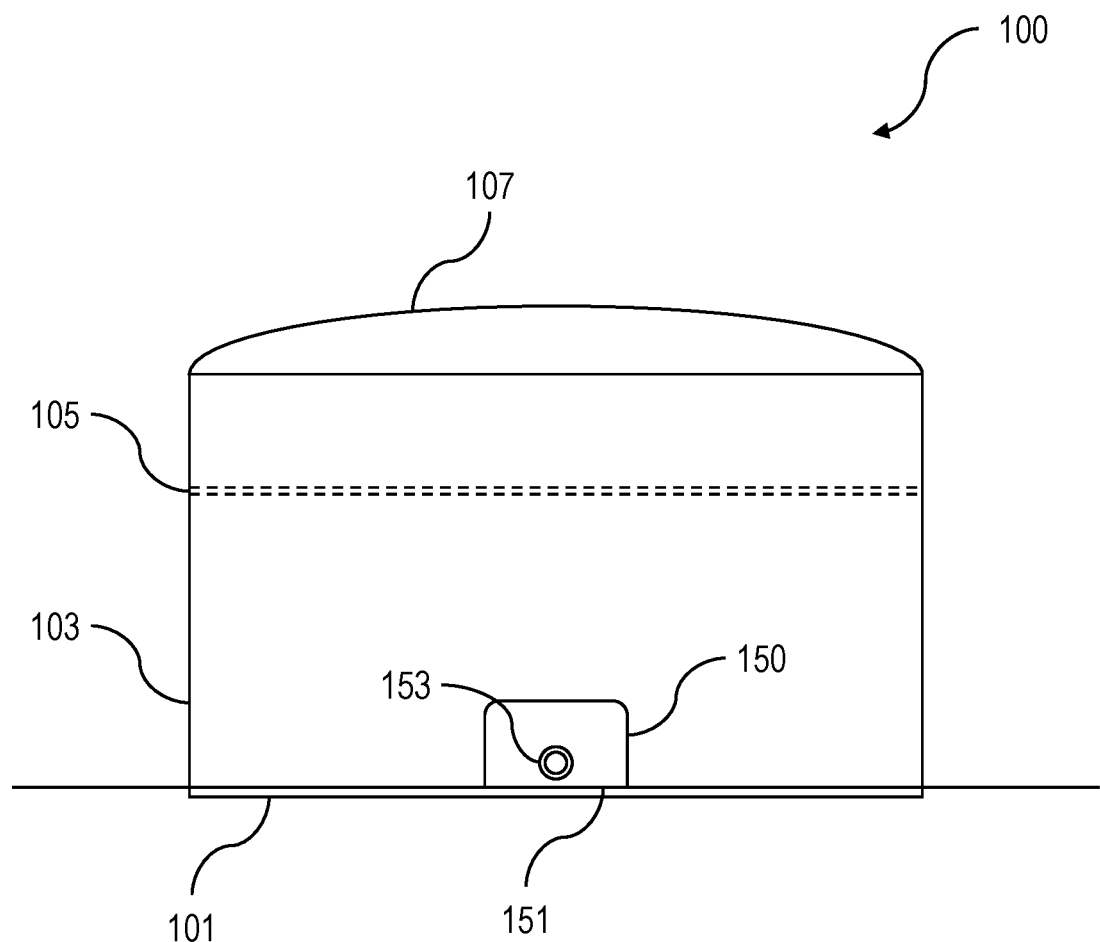
FIG. 1A is a schematic diagram of an example sulfur storage tank.

FIG. 1A is a schematic diagram of a sulfur storage tank 100. The sulfur storage tank 100 is configured to store sulfur in a liquefied state. The sulfur storage tank 100 includes a bottom plate 101, an outer wall 103, and a cleanout door 150. The outer wall 103 surrounds the bottom plate 101. The outer wall 103 is coupled to the bottom plate 101. In some implementations, the outer wall 103 is a cylindrical wall. The cleanout door 150 is installed on the outer wall 103. The cleanout door 150 includes an edge 151 that abuts the bottom plate 101. The cleanout door 150 includes a drain nozzle 153 installed on the cleanout door 150. The drain nozzle 153 defines a centerline offset from the edge 151. The drain nozzle 153 is configured to gravity drain fluid from the sulfur storage tank 100.

In some implementations, the sulfur storage tank 100 includes a floating roof 105. In some implementations, the outer wall 103 surrounds the floating roof 105. In some implementations, the outer wall 103 is coupled to the floating roof 105. In some implementations, the floating roof 105 is configured to move along a height of the outer wall 103 based on a liquid level of fluid stored within the sulfur storage tank 100. For example, as liquid flows out of the sulfur storage tank 100 and decreases the liquid level of fluid stored within the sulfur storage tank 100, the floating roof 105 lowers along the height of the outer wall 103. For example, as liquid flows into the sulfur storage tank 101 and increases the liquid level of fluid stored within the sulfur storage tank 100, the floating roof 105 rises along the height of the outer wall 103.

In some implementations, the sulfur storage tank 100 includes a top plate 107. In some implementations, the outer wall 103 surrounds the top plate 107. In some implementations, the outer wall 103 is coupled to the top plate 107. In some implementations, the floating roof 105 is disposed between the bottom plate 101 and the top plate 107. In relation to the bottom and top plates 101, 107, as liquid flows out of the sulfur storage tank 100 and decreases the liquid level of fluid stored within the sulfur storage tank 100, the floating roof 105 can move along the outer wall 103 toward the bottom plate 101 and away from the top plate 107. In relation to the bottom and top plates 101, 107, as liquid into the sulfur storage tank 100 and increases the liquid level of fluid stored within the sulfur storage tank 100, the floating roof 105 can move along the outer wall 103 away from the bottom plate 101 and toward the top plate 107.

Figure 1B:
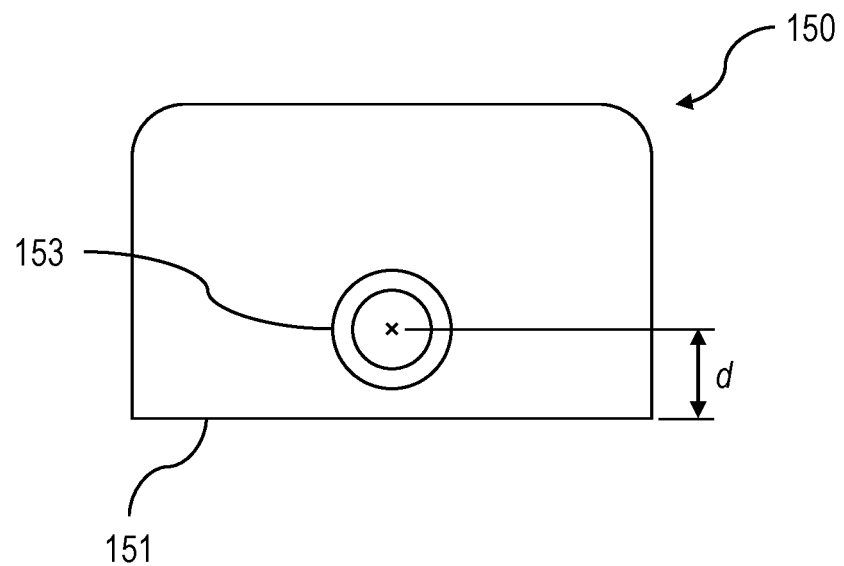
FIG. 1B is a schematic diagram of a front view of an example cleanout door that can be implemented on the sulfur storage tank of FIG. 1A.
Figure 1C:
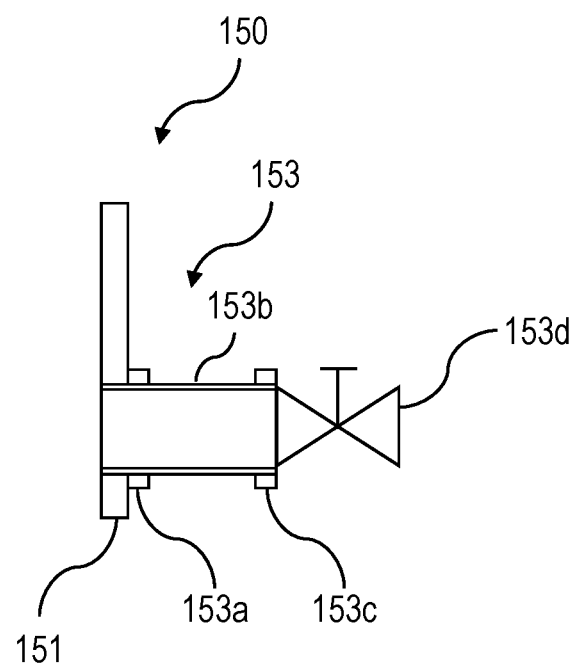
FIG. 1C is a schematic diagram of a side view of the cleanout door of FIG. 1B.

FIGS. 1B and 1C are schematic diagrams of a front view and a side view, respectively, of the cleanout door 150. In some implementations, the drain nozzle 153 includes a nozzle plate 153a. In some implementations, the drain nozzle 153 includes a tubular 153b. In some implementations, the drain nozzle 153 includes a flange 153c or an open end. In some implementations, the nozzle plate 153a and the flange 153c are coupled to the tubular 153b at opposite ends of the tubular 153b. In some implementations, the nozzle plate 153a is installed on the cleanout door 150, such that the tubular 153b protrudes from the cleanout door 150.

In some implementations, the drain nozzle 153 has an inner diameter in a range of from 4 inches (in.) to 6 in. For example, the nozzle plate 153a has an inner diameter in a range of from 4 in. to 6 in. For example, the tubular 153b has an inner diameter in a range of from 4 in. to 6 in. For example, the flange 153c has an inner diameter in a range of from 4 in. to 6 in. In some implementations, a perpendicular distance (d) from the edge 151 of the cleanout door 150 to the centerline of the drain nozzle 153 is less than 4 in. and non-zero. In some implementations, a perpendicular distance (d) from the edge 151 of the cleanout door 150 to the centerline of the drain nozzle 153 is less than 3 in. and non-zero.

In some implementations, the tubular 153b has a length in a range of from 4 in. to 18 in. In some implementations, a ratio of the length of the tubular 153b to the inner diameter of the drain nozzle 153 is in a range of from 1:1 to 3:1. In some implementations, a ratio of the length of the tubular 153b to the inner diameter of the nozzle plate 153a is in a range of from 1:1 to 3:1. In some implementations, a ratio of the length of the tubular 153b to the inner diameter of the tubular 153b is in a range of from 1:1 to 3:1. In some implementations, a ratio of the length of the tubular 153b to the inner diameter of the flange 153c is in a range of from 1:1 to 3:1.

In some implementations, the sulfur storage tank 100 includes heat tracing 155. In some implementations, the heat tracing 155 surrounds at least a portion of the drain nozzle 153. In some implementations, the heat tracing 155 surrounds at least a portion of the tubular 153b of the drain nozzle 153. In some implementations, the heat tracing 155 runs along at least a portion of the length of the tubular 153b of the drain nozzle 153. The heat tracing 155 can be, for example, electrical heat tracing or steam tracing. In some implementations, the sulfur storage tank 100 includes an insulating material. In some implementations, the insulating material surrounds at least a portion of the drain nozzle 153. In some implementations, the insulating material surrounds at least a portion of the tubular 153b of the drain nozzle 153. In some implementations, the insulating material runs along at least a portion of the length of the tubular 153b of the drain nozzle 153. The insulating material can be, for example, made of mineral wool. In some implementations, the insulating material is at least 1 inch thick. In some implementations, the insulating material has a density of at least 100 kilograms per cubic meter ($kg/m^3$). For example, the insulating material is 1.5 inches thick and has a density of 150 $kg/m^3$.

Figure 2:
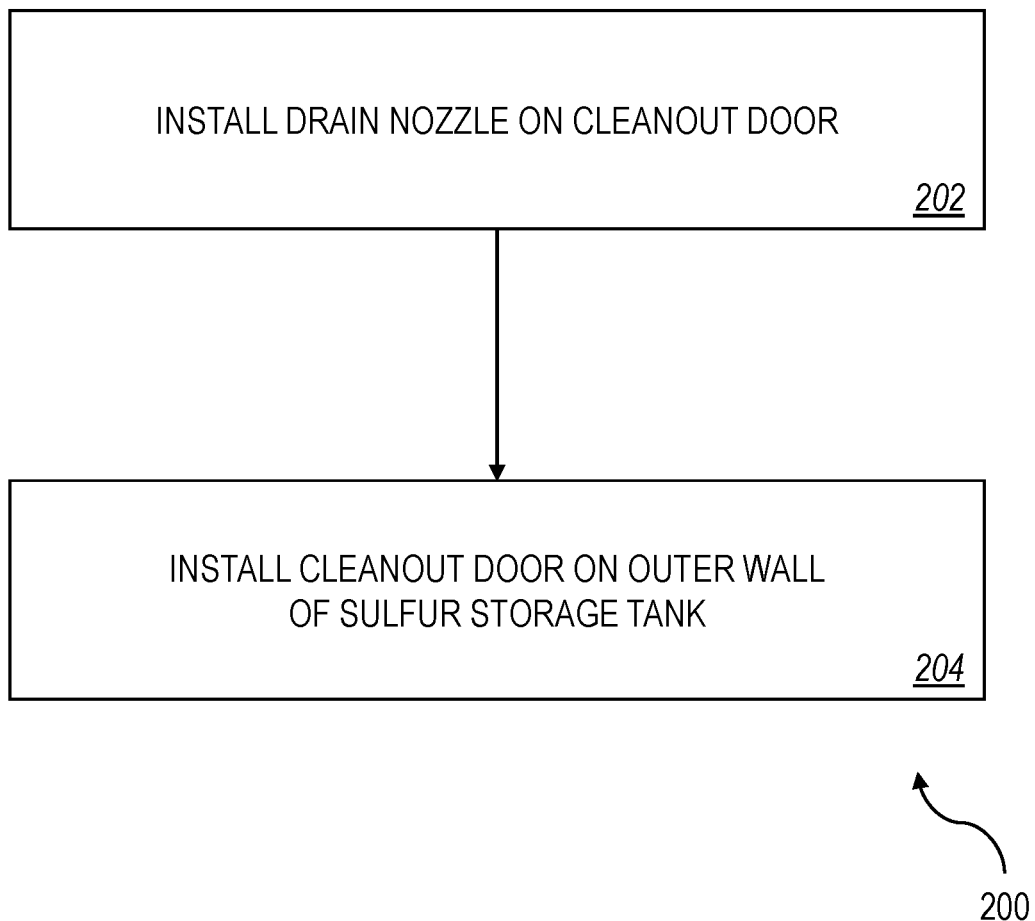
FIG. 2 is a flow chart of an example method for installing a cleanout door to a sulfur storage tank.

FIG. 2 is a flow chart of a method 200 for installing a cleanout door (such as the cleanout door 150) to a sulfur storage tank (such as the sulfur storage tank 100). At step 202, a drain nozzle (such as the drain nozzle 153) is installed on the cleanout door 150, such that a centerline of the drain nozzle 153 is offset from an edge (such as the edge 151) of the cleanout door 150. After step 202, the cleanout door 150 is installed on an outer wall (such as the outer wall 103) of the sulfur storage tank 100 at step 204. As mentioned previously, the sulfur storage tank 100 includes the bottom plate 101. The cleanout door 150 is installed on the outer wall 103 of the sulfur storage tank 100 at step 204, such that the edge 151 of the cleanout door 150 abuts the bottom plate 101 of the sulfur storage tank 100.

In some implementations, the drain nozzle 153 is installed on the cleanout door 150 at step 202, such that a perpendicular distance from the edge 151 of the cleanout door 150 to the centerline of the drain nozzle 153 is less than 4 in. and non-zero. In some implementations, installing the drain nozzle 153 on the cleanout door 150 at step 202 includes installing the nozzle plate 153a on the cleanout door 150, such that the tubular 153b protrudes from the cleanout door 150. In some implementations, the cleanout door 150 is installed on the outer wall 103 of the sulfur storage tank 100 at step 204, such that the tubular 153b protrudes radially outward from the outer wall 103.

In some implementations, the method 200 includes installing heat tracing (such as the heat tracing 155) on the sulfur storage tank 100. In some implementations, the method 200 includes installing the heat tracing 155 on the drain nozzle 153. In some implementations, the heat tracing 155 is installed on the drain nozzle 153, such that the heat tracing 155 surrounds at least a portion of the drain nozzle 153. In some implementations, the heat tracing 155 is installed on the drain nozzle 153, such that the heat tracing 155 surrounds at least a portion of the tubular 153b of the drain nozzle 153. In some implementations, the heat tracing 155 is installed on the drain nozzle 153, such that the heat tracing 155 runs along at least a portion of the length of the tubular 153b of the drain nozzle 153. In some implementations, the method 200 includes installing an insulating material on the sulfur storage tank 100. In some implementations, the method 200 includes installing an insulating material on the drain nozzle 153. In some implementations, the insulating material is installed on the drain nozzle 153, such that the insulating material surrounds at least a portion of the drain nozzle 153. In some implementations, the insulating material is installed on the drain nozzle 153, such that the insulating material surrounds at least a portion of the tubular 153b of the drain nozzle 153. In some implementations, the insulating material is installed on the drain nozzle 153, such that the insulating material runs along at least a portion of the length of the tubular 153b of the drain nozzle 153.

Figure 3:
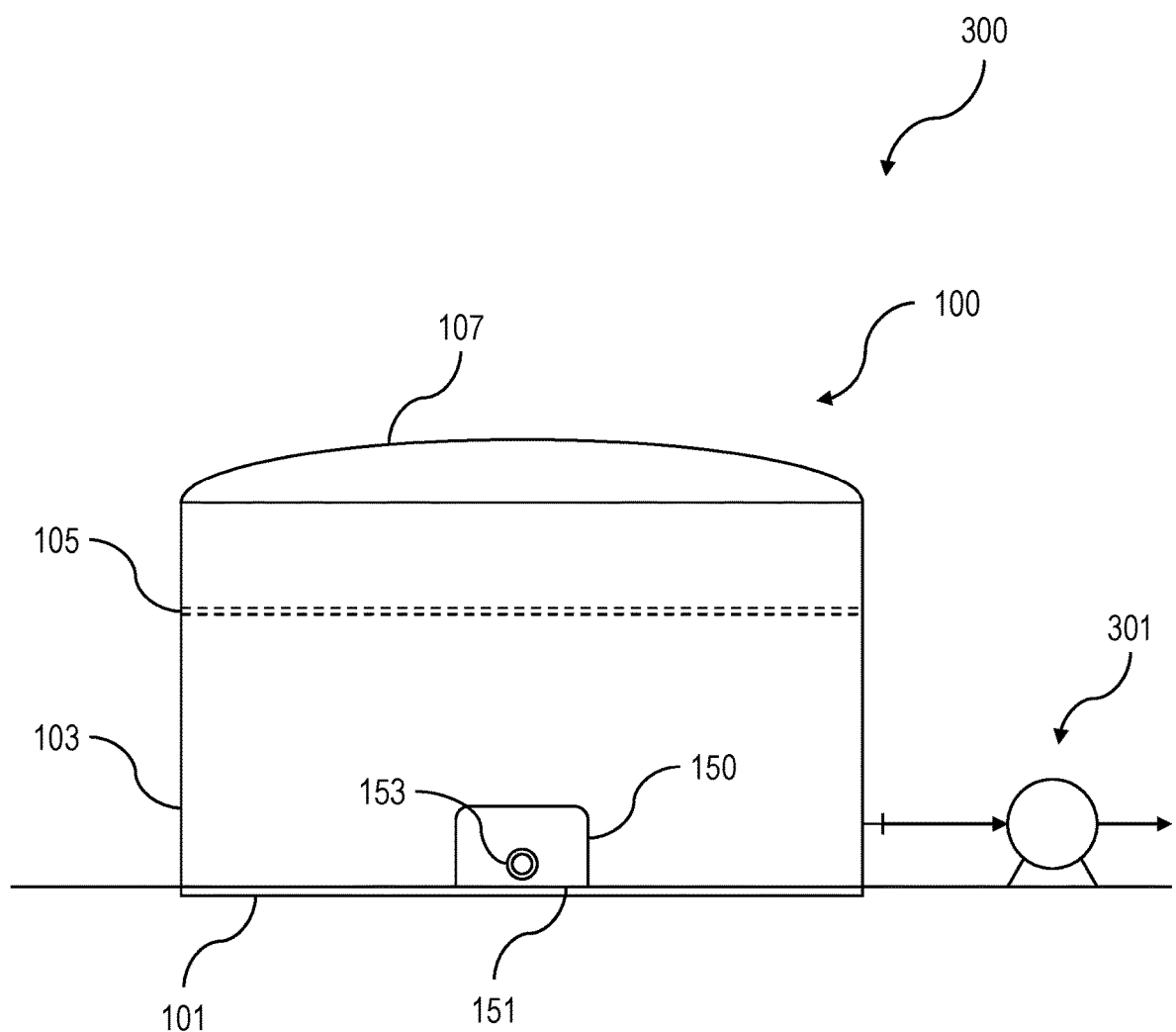
FIG. 3 is a schematic diagram of an example sulfur storage tank.

FIG. 3 is a schematic diagram of a system 300 including the sulfur storage tank 100. The system 300 includes a pump 301. In some implementations, the sulfur storage tank 100 includes a pump feed nozzle 130 installed on the outer wall 103. The pump feed nozzle 130 defines a centerline that has an elevation greater than the centerline of the drain nozzle 153 installed on the cleanout door 150 in relation to the bottom plate 101 of the sulfur storage tank 100. The pump 301 can be fluidically coupled to the pump feed nozzle 130. The pump 301 can be used, for example, to flow fluid out of the sulfur storage tank 100 through the pump feed nozzle 130. Once a minimum liquid level is reached within the sulfur storage tank 100, the pump 301 should not be used to drain more fluid from the sulfur storage tank 100 due to issues related to net positive suction head (NPSH). Once the minimum liquid level is reached within the sulfur storage tank 100, the drain nozzle 153 installed on the cleanout door 150 can be used to drain fluid from the sulfur storage tank 100.

Figure 4:
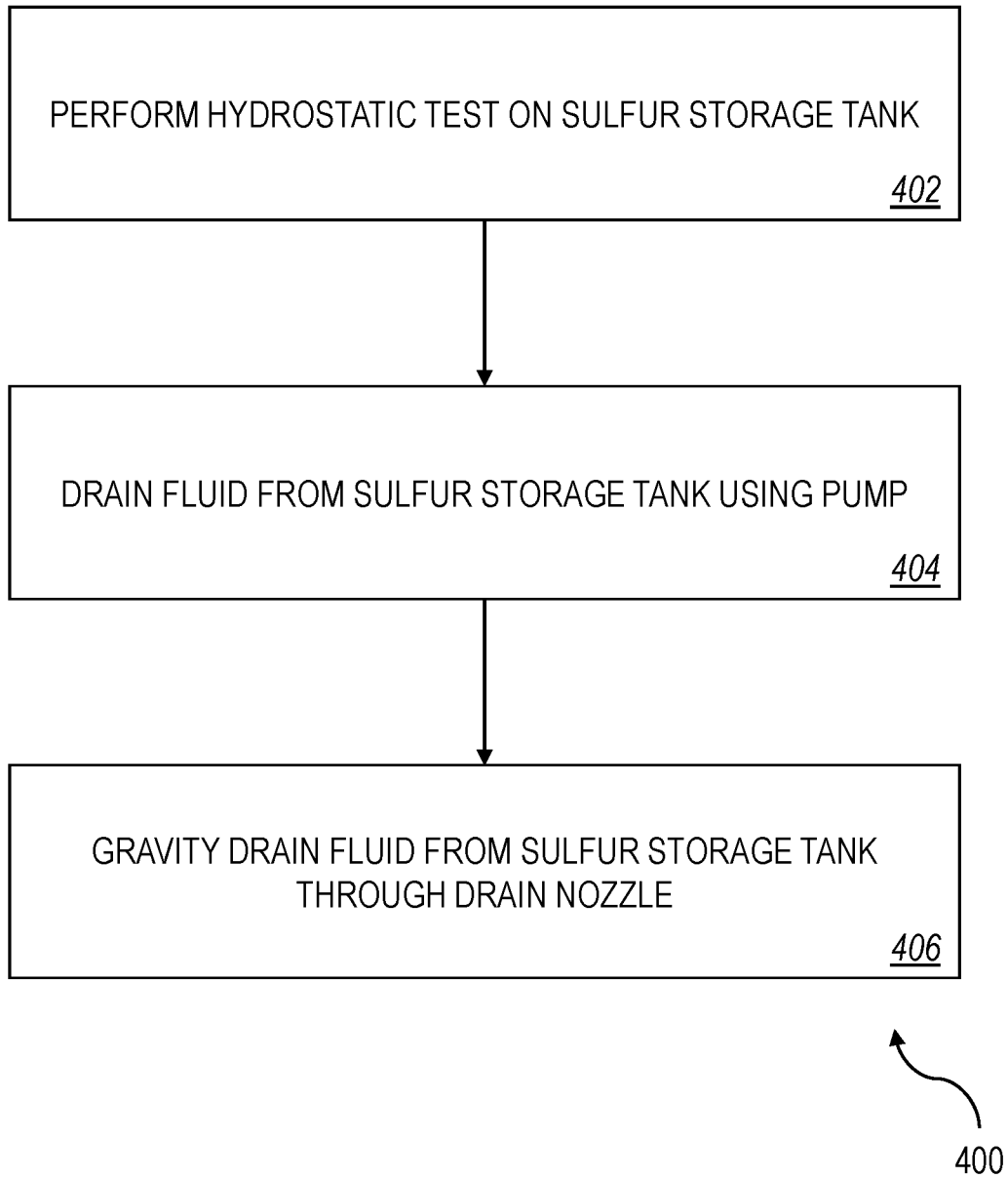
FIG. 4 is a flow chart of an example method for performing maintenance on a sulfur storage tank.

FIG. 4 is a flow chart of a method 400 for performing maintenance on a sulfur storage tank (such as the sulfur storage tank 100). The system 300 including the sulfur storage tank 100 can be used, for example, to implement method 400. At step 402, a hydrostatic test is performed on the sulfur storage tank 100. In some implementations, the hydrostatic test includes flowing water to the sulfur storage tank 100 to pressurize the sulfur storage tank 100 to a test pressure and then examining the sulfur storage tank 100 for leaks or changes in shape.

After step 402, fluid is drained from the sulfur storage tank 100 using a pump (such as the pump 301) at step 404. Fluid is drained from the sulfur storage tank 100 using the pump 301 at step 404 until a liquid level within the sulfur storage tank 100 reaches a minimum liquid level. The minimum liquid level can be, for example, the minimum liquid level needed to provide sufficient NPSH for the pump 301 described previously. As mentioned previously, the sulfur storage tank 100 can include the pump feed nozzle 130 installed on the outer wall 103. In some implementations, draining fluid from the sulfur storage tank 100 using the pump 301 includes draining fluid from the sulfur storage tank 100 through the pump feed nozzle 130.

After step 404, fluid is gravity drained from the sulfur storage tank 100 through the drain nozzle 153 at step 406. As mentioned previously, the sulfur storage tank 100 can include heat tracing 155. In some implementations, the method 400 includes activating the heat tracing 155 while gravity draining fluid from the sulfur storage tank 100 through the drain nozzle 153 at step 406. Activating the heat tracing 155 can include, for example, providing power to electrical heat tracing. Activating the heat tracing 155 can include, for example, providing steam to steam tracing. In some implementations, the method 400 includes deactivating the heat tracing 155 and blinding the drain nozzle 153 after gravity draining fluid from the sulfur storage tank 100 through the drain nozzle 153 at step 406. Blinding the drain nozzle 153 involves providing an obstruction to the drain nozzle 153 to prevent fluid from flowing through the drain nozzle 153. Blinding the drain nozzle 153 can include, for example, installing a blind on the flange 153c. In some implementations, an isolation valve 153d installed on flange 153c is used to blind and/or isolate the drain nozzle 153.

Although shown in FIGS. 1A, 1B, 1C, and 3 as including one drain nozzle 153, the cleanout door 150 can include additional drain nozzles 153, such as two drain nozzles 153, three drain nozzles 153, or more than three drain nozzles 153. While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
   performing a hydrostatic test on a sulfur storage tank comprising:
      a bottom plate;
      an outer wall surrounding and coupled to the bottom plate; and
      a cleanout door installed on the outer wall, the cleanout door comprising:
         an edge abutting the bottom plate; and
         a drain nozzle installed on the cleanout door, the drain nozzle defining a centerline offset from the edge, wherein the drain nozzle is configured to gravity drain fluid from the sulfur storage tank;
   after performing the hydrostatic test, draining fluid from the sulfur storage tank using a pump until a liquid level within the sulfur storage tank reaches a first liquid level; and
   after draining fluid from the sulfur storage tank using the pump, gravity draining fluid from the sulfur storage tank through the drain nozzle.

2. The method of claim 1, wherein the sulfur storage tank comprises a pump feed nozzle installed on the outer wall, and draining fluid from the sulfur storage tank using the pump comprises draining fluid from the sulfur storage tank through the pump feed nozzle.

3. The method of claim 2, wherein the sulfur storage tank comprises heat tracing surrounding at least a portion of the drain nozzle, and the method comprises activating the heat tracing while gravity draining fluid from the sulfur storage tank through the drain nozzle.

4. The method of claim 3, comprising, after gravity draining fluid from the sulfur storage tank through the drain nozzle of the cleanout door, deactivating the heat tracing and blinding the drain nozzle.

5. The method of claim 4, wherein a perpendicular distance from the edge of the cleanout door to the centerline of the drain nozzle is less than 4 inches and non-zero.

6. A method comprising:
   installing a drain nozzle on a cleanout door, such that a centerline of the drain nozzle is offset from an edge of the cleanout door;
   after installing the drain nozzle on the cleanout door, installing the cleanout door on an outer wall of a sulfur storage tank comprising a bottom plate, such that the edge of the cleanout door abuts the bottom plate of the sulfur storage tank;
   performing a hydrostatic test on the sulfur storage tank;

after performing the hydrostatic test, draining fluid from the sulfur storage tank using a pump until a liquid level within the sulfur storage tank reaches a first liquid level; and after draining fluid from the sulfur storage tank using the pump, gravity draining fluid from the sulfur storage tank through the drain nozzle.

7. The method of claim 6, wherein the drain nozzle has an inner diameter in a range of from 4 inches to 6 inches and a length in a range of from 4 inches to 18 inches.

8. The method of claim 7, the drain nozzle is installed on the cleanout door, such that a perpendicular distance from the edge of the cleanout door to the centerline of the drain nozzle is less than 4 inches and non-zero.

9. The method of claim 8, wherein:
the drain nozzle comprises a nozzle plate, a tubular, and a flange;
the nozzle plate and the flange are coupled to the tubular at opposite ends of the tubular; and
installing the drain nozzle on the cleanout door comprises installing the nozzle plate on the cleanout door, such that the tubular protrudes from the cleanout door.

10. The method of claim 9, wherein a ratio of a length of the tubular to the inner diameter of the drain nozzle is in a range of from 1:1 to 3:1.

11. The method of claim 9, comprising installing heat tracing on the drain nozzle, such that the heat tracing surrounds at least a portion of the tubular of the drain nozzle.

\* \* \* \* \*